(12) United States Patent
Discher et al.

(10) Patent No.: US 6,523,864 B1
(45) Date of Patent: Feb. 25, 2003

(54) CONNECTOR

(75) Inventors: Thomas Discher, Melsungen (DE); Sigbert Hauser, Bebra (DE); Rolf Schlein, Rotenburg (DE); Rüdiger Stange, Nentershausen (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/530,660

(22) PCT Filed: Oct. 27, 1998

(86) PCT No.: PCT/EP98/06795

§ 371 (c)(1),
(2), (4) Date: Jul. 6, 2000

(87) PCT Pub. No.: WO99/23408

PCT Pub. Date: May 14, 1999

(30) Foreign Application Priority Data

Oct. 30, 1997 (DE) .......................... 197 47 959

(51) Int. Cl.$^7$ ................................ F16L 37/18
(52) U.S. Cl. .................. 285/319; 285/320; 285/379
(58) Field of Search ................. 285/319, 320, 285/379

(56) References Cited

U.S. PATENT DOCUMENTS

| 3,826,523 A |   | 7/1974  | Eschbaugh |
|-------------|---|---------|-----------|
| 4,749,214 A | * | 6/1988  | Hoskins et al. ............. 285/4 |
| 4,775,170 A |   | 10/1988 | Usui et al. |
| 5,078,429 A | * | 1/1992  | Braut et al. .................. 285/4 |
| 5,324,082 A | * | 6/1994  | McNaughton et al. ........ 285/93 |
| 5,573,279 A | * | 11/1996 | Rea et al. .................. 285/21.1 |
| 5,662,359 A |   | 9/1997  | Kargula |
| 5,964,485 A | * | 10/1999 | Hame et al. |
| 5,984,378 A | * | 11/1999 | Ostrander et al. .......... 285/319 |
| 6,173,998 B1| * | 1/2001  | Bock .......................... 285/319 |

FOREIGN PATENT DOCUMENTS

| DE | 2824968    |   | 12/1979 |
| DE | 3490571    |   | 6/1985  |
| DE | 4306028    |   | 9/1994  |
| EP | 0 459 812 A1 | * | 4/1991 |
| GB | 1 158 358  | * | 7/1969  |
| WO | 8704767    |   | 8/1987  |

* cited by examiner

Primary Examiner—Robert J. Sandy
Assistant Examiner—Carlos Lugo
(74) Attorney, Agent, or Firm—Martin A. Farber

(57) ABSTRACT

In a plug-in connection (1), in particular for fluid lines, which comprises a part of the connection (2) to be inserted and a receiving part of the connection (3), between which a seal (10) can be clamped and which are able to be releasably connected to one another by flexible snap-in elements (7, 18) in a snap-in position, the seal (10) can, be clamped between a front portion (4) of the part of the connection (2) to be inserted and an abutment (11) in the receiving part of the connection (3) and the distance of the snap-in elements (7) of the part of the connection (2) to be inserted from the front portion (4) of the latter is dimensioned such that the snap-in position is reached after slight axial compression, and if need be radial compression, of the flexible seal (10).

19 Claims, 2 Drawing Sheets

CONNECTOR

FIELD AND BACKGROUND OF THE INVENTION

The invention concerns a plug-in connection, in particular for fluid lines, comprising a part of the connection to be inserted and a receiving part of the connection, between which a seal can be clamped and which are able to be releasably connected to one another by flexible snap-in elements in a snap-in position Plug-in connections of this kind are known from practice in a wide variety of forms. To simplify the joining together of plug-in connections, a snap-in connection with resiliently snap-engaging holding elements, which correspond in pairs on the part of the connection to be inserted ("male" part) and on the receiving part of the connection ("female" part), is usually provided. Normally, flexible snap-in hooks or the like are provided on the receiving part, while the outer contour of the part to be inserted is provided with a step-shaped collar or annular collar, which serves as an abutment for the radially inwardly directed snap-in hooks. At the same time as the joining together, the necessary sealing of such a plug-in connection is ensured by a seal (sealing ring, flat gasket or the like) coming to bear on both sides, even before snap-in engagement of the holding elements, and possibly being compressed radially, at least slightly, before the snap-in position is reached. This achieves radial prestressing of the seal, which prevents any escape of a fluid flowing via the plug-in connection and/or the entry of foreign substances (air, contaminants) into the connected line. Depending on the mechanical loading of the plug-in connection by external forces such as tension/bending or by internal compressive forces in the case of fluidic plug-in connections, the snap-in connection must be very secure. This sometimes gives rise to problems when separating the connection, manual disassembly without tools always been preferable. The part of the connection to be inserted is often provided on its front outer circumference with a bevel, which assists its introduction into the receiving part.

SUMMARY OF THE INVENTION

The invention is based on the object of specifying a simple plug-in connection with an improved sealing effect.

accordingly to the invention, the seal can be clamped between a front region of the part of the connection to be inserted and an abutment in the receiving part of the connection. At the same time, the distance of the snap-in elements of the part of the connection to be inserted from the front region of the latter is dimensioned such that the snap-in position can be reached just by slight compression of the seal in the axial direction. This has the advantage that the effective inside diameter of the seal, and consequently also the surface area subjected to internal pressure, is smaller than in the case of a seal which bears only radially on the outside against the part to be inserted, while its end face is completely free. If at least one portion of the seal is in bearing contact between the outer circumferential surface of the front region of the part of the connection to be inserted and the inner circumference of the receiving part of the connection, the connection is less sensitive to slight deviations from the alignment of the two parts of the connection, which may arise for example due to external force effects. The above advantageous effect is achieved in a particularly expedient way if the seal is of an annular design with an unround cross section and with an inside diameter that changes over its axial extent, a portion with a greater inside diameter bearing against the outer circumferential surface of the part of the connection to be inserted. This form has the effect that, toward the part to be inserted, the mouth of the seal forms a funnel contour, which makes it easier for said part to be introduced. The radially drawn-in portion then lies in front of the front end of the part of the connection and forms the axial seal. The seal could be arranged and fastened on the front region of the part to be inserted. It is more expedient, however, because it is better protected against damage before and during the joining together of the plug-in connection, if the seal is fastened in the interior space of the receiving part. The introduction and bringing into contact of the part of the connection to be introduced is made very much easier and the seal remains largely protected from damage if the front outer region, or the front circumferential surface, of the part of the connection to be inserted is provided in a way known per se with a bevel or chamfer. When the chamfered circumferential surface is in contact with the seal and is compressing the latter both in the axial direction and in the radial direction, on the one hand particularly good sealing quality is achieved, on the other hand the necessary joining force is reduced by the wedging effect. A major advantage with regard to quality assurance is achieved if a stop that limits the insertion depth of the part of the connection to be inserted and acts independently of the snap-in means and the seal is provided. Then the part of the connection can be pushed in at most to a fixed depth, the snap-in position already having been reached before this. Inadvertent pinching of the flexible seal is reliably prevented in this way. Of course, such a stop could be provided on the receiving side, in the interior space, or be realized by an additional component. In a particularly simple way, however, this stop is formed by at least one radial projection formed onto the part of the connection to be inserted, for example an annular collar, the outer size of which is greater than the circular opening of the receiving part of the connection.

With regard to the internal bracing of the plug-in connection between the seal and the snap-in elements, it is also of advantage if the snap-in elements can be released from the snap-in engagement by means of releasing aids or lifting-out means that are separate or formed directly on them. This makes the intentional separation of the plug-in connection very much easier. It also avoids damage being caused by improper use of tools and ensures that the parts of the connection can continue to be used after separation.

Production engineering advantages arise if the snap-in hooks and the lifting-out means are integrally formed onto the receiving part of the connection; since all the parts of the plug-in connection are preferably produced from injection-moldable plastic, it is relatively easily possible for such integral snap-in elements with releasing aids to be formed in an injection mold.

In a particularly expedient embodiment, the snap-in hooks and the lifting-out means are connected to the part of the connection via thin webs and are designed as levers which can be flexibly pivoted by pressing in the lifting-out means and twisting the webs. With this configuration, extremely economical use of material is possible, because the snap-in hooks and lifting-out means can be produced as component parts of the outer wall of the receiving part of the connection and can be easily punched free from said outer wall by slits.

A preferred use of these plug-in connections is for establishing low-pressure hose connections in motor vehicles, for example for windshield washing and/or windshield cleaning systems. They may also be used in systems of lines for pneumatic central locking systems or other loads controlled by pressure or negative pressure.

The plug-in connection discussed here would also be suitable, however, for waterproof and pressuretight contacting of electrical conductors, which could be introduced for example along with the required end plug-in contacts into the interior hollow spaces of the parts of the connection.

BRIEF DESCRIPTION OF THE DRAWINGS

Further details and advantages of the subject matter of the invention emerge from the drawings of an exemplary embodiment and the detailed description of the latter following below.

Represented in sectional form in the drawings.

DETAILED DESCRIPTION OF THE PREFERRED EMBODIMENT

Figure 1:
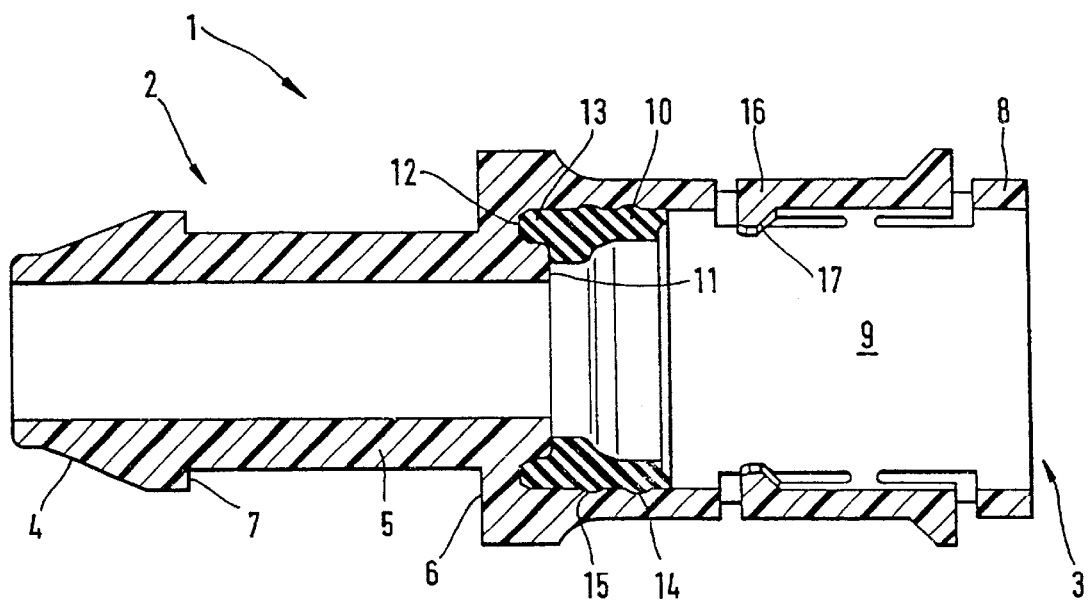
FIG. 1 shows an adaptor, which is provided on one side as a receiving part of the connection and on the other side as a part of the connection to be inserted, as a combination of all the elements of the plug-in connection.
Figure 2:
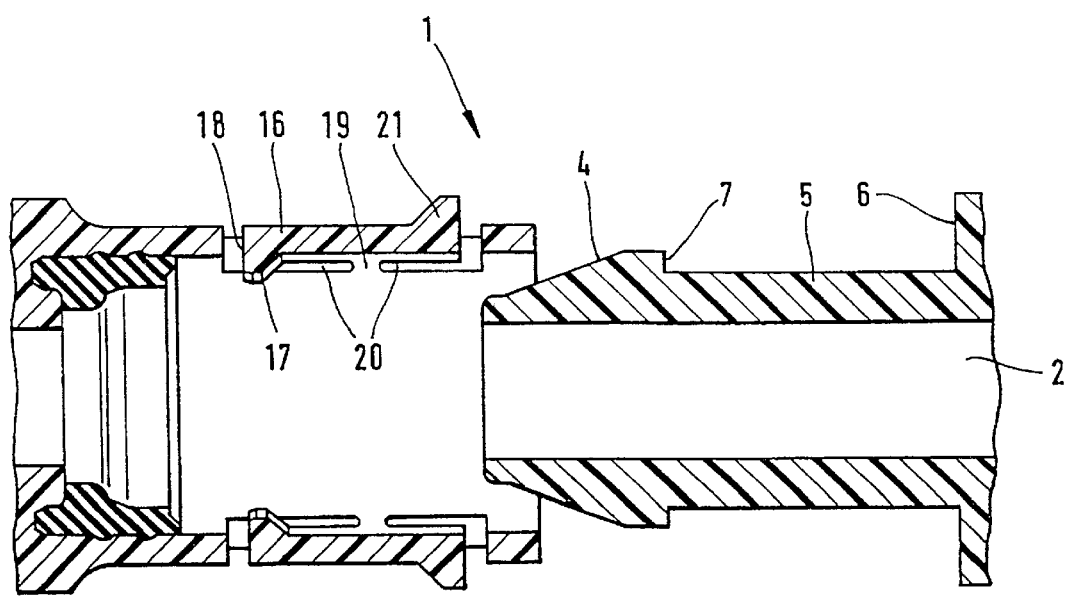
FIG. 2 shows a part of the plug-in connection to be inserted and a receiving part of said connection, during joining together.

According to FIG. 1, a plug-in connection 1 respectively comprises a part of the connection 2 to be inserted (male part) and a receiving part of the connection 3 (female part), which are preferably both rotationally symmetrical. The tubular part of the connection 2 essentially comprises a front portion 4, a hollow-cylindrical shank 5 and an annular collar 6 surrounding the shank. The front portion 4 has the same inside diameter as the shank, but its outer circumferential surface is essentially shaped as a truncated cone. Short cylindrical portions may be provided on both sides of the truncated cone. On its end edge, the outside diameter of the front portion 4 is smaller than that of the shank 5 and increases continuously toward the shank, beyond the diameter of the latter. Thus, a bevel or chamfer is formed, making it easier for the front portion 4 to be introduced into the corresponding receiving part of the connection 3 (compare FIG. 2). At the transition to the shank 5, a step 7 reduces the outside diameter of the front portion from the maximum size to the somewhat smaller diameter of the shank 5. The step 7 forms one of the snap-in elements, the overall function of which is still to be discussed later.

In comparison with the part of the connection 2 to be inserted, the likewise tubular receiving part of the connection 3 is of a more complicated construction. Its inside diameter corresponds essentially to the maximum diameter of the front (frustoconical) portion 4. At a distance from an end opening 8, an annular seal 10 of elastomeric TPE (tetrapolyethylene) with an unround cross section has been fitted into the interior space 9 of the part of the connection 3. Radially on the outside, said seal bears against the hollow-cylindrical inner wall of the interior space 9. In the axial direction, it has been pushed against a step 11 as an abutment, which reduces the diameter of the interior space 9 behind the seal to a size corresponding to the inside diameter of the part of the connection 2 to be inserted and prevents axial yielding of the seal 10 when the plug-in connection 1 is joined together. Formed into the step 11, along its outer circumference, in the axial direction is a channel or groove 12, into which an axially projecting annular continuation 13 of the seal 10 has been pushed. To secure the seal 10 axially against falling out—during separation of the plug-in connection—also formed onto the outer circumference of said seal, widening it, are two annular webs 14, which fall into corresponding channels 15 in the inner wall of the part of the connection 3 when the seal has been fully pushed in.

The inside diameter of the seal 10 narrows from a greater size, facing the opening 8, to a smaller size, facing the step 11, doing so not continuously but in a short, step-like transitional region. On both its sides, the inner circumferential surfaces of the seal are approximately hollow-cylindrical, with different diameters.

Finally, further snap-in elements are provided in the outer wall of the receiving part of the connection 3, preferably formed integrally onto the part of the connection, which is injection-moulded from POM (polyoxymethylene). Two mutually opposite snap-in hooks 16, which protrude into the interior space 9, can be seen, having a flank 17 that is oriented toward the opening 8 and runs obliquely with respect to the longitudinal axis of the plug-in connection, and an end flank 18 that is oriented toward the step 11 and runs perpendicularly with respect to the longitudinal axis. The snap-in hooks 16, each connected to the part of the connection 3 via a thin web 19, are punched free from the remaining outer wall by longitudinal slits 20 extending between the respective web 19 and the end flank 18, so that they can spring in and out resiliently in the radial direction. Lifting-out means 21 have been formed on, likewise punched free by slits, on the far side of webs 19 as releasing implements. The snap-in hooks 16 and the lifting-out means 21 thus form two-armed levers or rockers with a pivot axis lying in the region of the respective web.

For further functional explanation, a joined-together plug-in connection is explained with reference to FIG. 3. Identical reference numerals identify the elements of the drawing already introduced above. The lines adjoining the parts of the connection 2 and 3 on both sides (for example hoses, pipes, cables) and the corresponding connecting means for establishing the connection are not represented, because they are not relevant to the actual connection.

Figure 3:
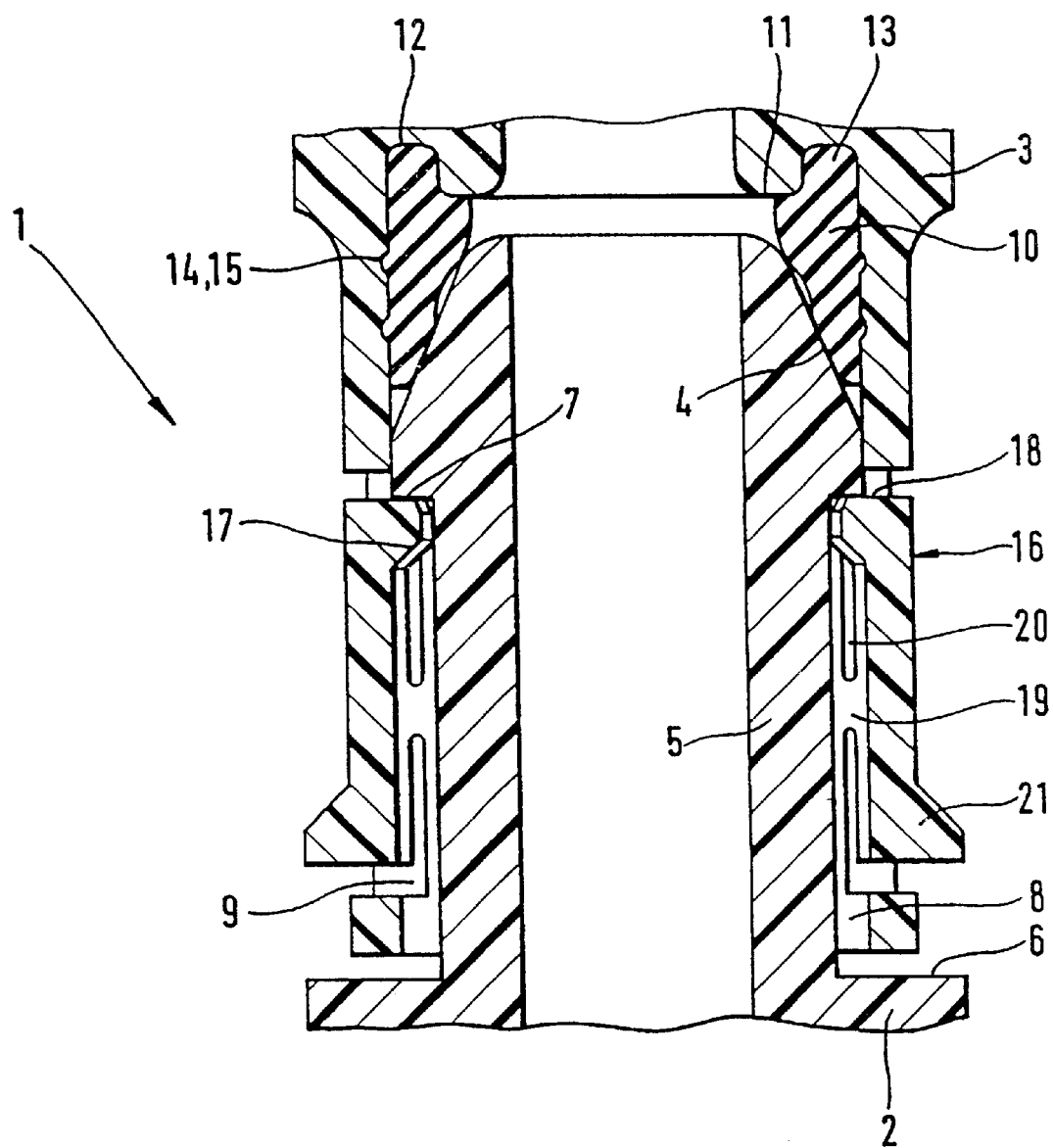
FIG. 3 shows a joined-together plug-in connection in an enlarged view to illustrate the bearing contact of the seal and the function of the snap-in elements.

In the enlarged representation according to FIG. 3 it can be seen that the end flanks 18 of the snap-in hooks 16 on the part of the connection 3 have fallen in behind the step 7 between the front portion 4 and the shank 6 of the part of the connection 2. During joining together of the plug-in connection 1, they must temporarily spring out while twisting the webs 19. It can also be seen that the seal 10 has come to bear flat against the frustoconical front portion 4 of the fully introduced part of the connection 2. However, the front edge of the portion 4 does not come to bear against the step 11. It cannot run up against it even if excessive joining force is applied, because before that the annular collar 6 would run up against the outer edge of the circular opening 8. Consequently, the seal 10 is effectively protected against inadvertent pinching. It cannot yield axially, because it is pushed against the step 11. With respect to the function of the annular collar, it should be noted that this can also be realized by at least one radially protruding projection, which does not have to extend over the entire circumference. However, two or more mutually opposite projections should expediently be provided.

In the joined-together position, the seal 10 is compressed in both the axial direction and the radial direction, so that on the one hand a radial elastic force component is produced for the mutual sealing of the circumferential surfaces and on the other hand an axial elastic force component is produced for sealing between the step 11 and the radial element of the surface area of the front portion 4 projected in the axial direction. The resultant significant increase in force during joining together on the one hand provides a perceptible indication back to a fitter that the end position of the part of the connection to be inserted has been reached, on the other it brings about constant prestressing against the snap-in elements, so that a particularly secure connection that is free from backlash is ensured. To a slight extent, the seal 10 also compensates in its elastic deformation for dimensional deviations of the parts of the connection or snap-in elements.

Finally, it can be seen that, because of the stepped cross-sectional constriction of the inside diameter of the seal 10, two separate contact areas form between the seal and the frustoconical portion 4. As a result, particularly high, surface pressure, providing effective sealing, is produced in these regions. However, because of the wedging effect of the frustoconical front portion 4, the joining together of the plug-in connection 1 is possible with less force than if the seal 10 were to be compressed purely axially by the end face of the part to be inserted, as known in the case of connections secured by screws (with a union nut or the like), with their very much higher joining forces.

The elastomeric material to be displaced during compression of the seal 10 can on the one hand enter the region between the two annular contact areas, on the other hand enter the separating joint between the end face of the portion 4 and the step 11. The latter separating joint is consequently largely filled, so that flow resistances caused by vortices occurring here can be minimized. By suitable shaping of the seal in the contact region with respect to the step 11, the separating joint can be completely filled, if need be, and thus an entirely smooth transition from the part of the connection to be inserted to the receiving part of the connection can be created. The entry of the annular continuation 13 into the groove 12 has the effect of forming a labyrinth arrangement on the end face of the seal 10, at the step 11, which likewise represents a high degree of security against leaks.

For releasing the snap-in engagement or separating the plug-in connection 1 it is sufficient to apply a pressure radially inward to the lifting-out means 21 that can be exerted for example with the thumb and index finger of one hand. The lifting-out means 21 then temporarily enter the interior space 9 of the part of the connection 3 or the remaining annular gap between the shank 6 and the inner wall of the part of the connection 3. The webs 19, which are preferably respectively arranged on both sides of the snap-in hooks or lifting-out means, are flex listed. As a consequence, the snap-in hooks 16 pivot radially outward, and the end flanks 18 release the step 7, so that the part of the connection 2 can be pulled out without effort and without the use of a tool. It goes without saying that the torsional rigidity of the webs is to be less than the flexural rigidity of the snap-in hooks and lifting-out means.

List of Designations 1. plug-in connection
2. part of the connection to be inserted
3. receiving part of the connection
4. front portion (truncated cone)
5. hollow-cylindrical shank
6. annular collar
7. step
8. end opening
9. interior space
10. annular seal
11. step
12. groove
13. annular continuation
14. annular web
15. channels
16. snap-in hooks
17. flank
18. end flank
19. web
20. longitudinal slit
21. lifting-out means

We claim:

1. A plug-in connection (1), in particular for fluid lines, comprising a part of the connection (2) to be inserted and a receiving part of the connection (3), between which a seal (10) can be clamped and which are able to be releasably connected to one another by flexible snap-in elements (7, 18) in a snap-in position, wherein the seal (10) is clampable between a front portion (4) of the part of the connection (2) to be inserted and an abutment (11) in the receiving part of the connection (3), wherein a circumference of the abutment is smaller than an outer circumference of the insertable part of the connection for compressing the seal in the axial direction of the connection upon insertion of the insertable part into the receiving part of the connection, and wherein the distance of the snap-in elements (7) of the part of the connection (2) to be inserted from the front portion (4) of the latter and of the snap-in elements (16) of the receiving part of the connection (3) from the seal (10) are dimensioned such that the snap-in position can be reached after slight axial compression of the flexible seal (10), and there is formed into said abutment (11) a groove (12), into which an axial continuation (13) of the seal (10) has been pushed for forming a labyrinth system, wherein said seal is fastened in an interior space of the receiving part of the connection, said seal is pushed in the radial direction, and in the axial direction against the abutment, and is secured against pulling out by radial form-fitting elements (14, 15).

2. The plug-in connection as claimed in claim 1, wherein at least one portion of the seal (10) is clampable between an outer circumferential surface of the front portion (4) of the part of the connection (2) to be inserted and the inner circumference of the receiving part of the connection (3).

3. The plug-in connection as claimed in claim 1, wherein the seal (10) is of an annular form with an unround cross section and with an inside diameter that changes over its axial extent, a portion with a greater inside diameter bearing radially on the outside against the front portion (4) of the part of the connection (2) to be inserted.

4. The plug-in connection as claimed in claim 1, wherein a circumferential surface of the front portion (4) of the part of the connection (2) to be inserted is provided with a bevel or chamfer.

5. The plug-in connection as claimed in claim 1, wherein a chamfered circumferential surface of the front portion (4) of the part of the connection (2) to be inserted is in contact with the seal (10) and compresses the latter both in the axial direction and in the radial direction.

6. The plug-in connection as claimed in claim 1, wherein a stop (6) that limits the insertion depth of the part of the connection (2) to be inserted into the receiving part of the connection (3) is provided.

7. The plug-in connection as claimed in claim 6, wherein the stop is formed by a projection formed onto the part of the connection to be inserted, the outer size of which is greater than the opening (8) of the receiving part of the connection.

8. The plug-in connection as claimed in claim 1, wherein a snap-in element (step 7) which is grippable from behind by snap-in elements (16, 18) of the receiving part of the connection (3) is provided on the front portion (4).

9. The plug-in connection as claimed in claim 1, wherein the snap-in elements of the receiving part of the connection (3) are formed as flexible snap-in hooks (16) with an end flank (18) which, in the snap-in position, grips behind a snap-in element (7) of the part of the connection (2) to be inserted.

10. The plug-in connection as claimed in claim 9, wherein the snap-in hooks (16) or their end flanks can be released manually from the snap-in engagement by lifting-out means (21).

11. The plug-in connection as claimed in claim 10, wherein said snap-in hooks (16) and said lifting-out means (21) are integrally formed onto the receiving part of the connection (3).

12. The plug-in connection as claimed in claim 10, wherein the snap-in hooks (16) and the lifting-out means (21) are connected to the part of the connection (3) via thin webs (19) and are formed as two-armed levers which can be flexibly pivoted by pressing in the lifting-out means (21) and twisting the webs (19).

13. The plug-in connection as claimed in claim 11, wherein the snap-in hooks (16) and the lifting-out means (21) are connected to the part of the connection (3) via thin webs (19) and are formed as two-armed levers which can be flexibly pivoted by pressing in the lifting-out means (21) and twisting the webs (19).

14. The plug-in connection as claimed in claim 2, wherein the seal (10) is of an annular form with an unround cross section and with an inside diameter that changes over its axial extent, a portion with a greater inside diameter bearing radially on the outside against the front portion (4) of the part of the connection (2) to be inserted.

15. The plug-in connection as claimed in claim 1, further comprising a shank (5) connected at a first end to the front portion (4) and an annular stop (6) extending around an end of said shank (5) opposite the connection to the front portion (4).

16. The plug-in connection as claimed in claim 15, wherein said shank (5) is a hollow cylinder having an internal diameter substantially equal to an internal diameter of said front portion (4).

17. The plug-in connection as claimed in claim 16, wherein said front portion (4) has an outer diameter smaller than an outer diameter of said shank (5) at an end opposite the connection to the shank (5), said diameter of said front portion (4) increasing gradually along a length of said front portion (4) towards the connection to said shank (5) to a diameter larger than the outer diameter of the shank (5).

18. A plug-in connection, suitable for a fluid line, comprising an insertable part of the connection and a receiving part of the connection, between which a flexible seal is clamped and which are able to be releasably connected to one another by flexible snap-in elements in a snap-in position, wherein the seal is clamped between a front portion of the insertable part of the connection and a step in the receiving part of the connection, and wherein the distance of the snap-in elements of the insertable part of the connection from the front portion of the latter and of the snap-in elements of the receiving part of the connection from the seal are dimensioned such that the snap-in position can be reached after slight axial compression of the seal; and there is formed into said step (11) a groove (12), into which an axial annular continuation (13) of the seal (10) has been pushed for forming a labyrinth system.

19. A plug-in connection, suitable for a fluid line, comprising an insertable part of the connection and a receiving part of the connection, between which a flexible seal is clamped and which are able to be releasably connected to one another by flexible snap-in elements in a snap-in position, wherein the seal is clamped between a front portion of the insertable part of the connection and an abutment in the receiving part of the connection, wherein a circumference of the abutment is smaller than an outer circumference of the insertable part of the connection for compressing the seal in the axial direction of the connection upon insertion of the insertable part into the receiving part of the connection, and wherein the distance of the snap-in elements of the insertable part of the connection from the front portion of the latter and of the snap-in elements of the receiving part of the connection from the seal are dimensioned such that the snap-in position can be reached after slight axial compression of the seal; and wherein said seal is fastened in an interior space of the receiving part of the connection, said seal is pushed by the front portion of the insertable part of the connection in the radial direction towards a circumferential surface of the receiving part of the connection and in the axial direction against the abutment of the receiving part of the connection, a groove is disposed in a radially extending wall of the abutment and radial form-fitting elements are disposed circumferentially of the seal in the receiving part of the connection, said seal being pushed into said groove and said form-fitting elements by the front portion of the insertable part of the connection.

* * * * *